US010911841B2

United States Patent
Baheti et al.

(10) Patent No.: US 10,911,841 B2
(45) Date of Patent: Feb. 2, 2021

(54) TELEMETRY UNIT FOR HIGH SPEED SHAFT ASSEMBLIES

(71) Applicant: Kaydon Ring & Seal, Inc., Baltimore, MD (US)

(72) Inventors: Sanjay Baheti, Brookeville, MD (US); Jared Manry, Shrewsbury, PA (US)

(73) Assignee: KAYDON RING & SEAL, INC., Baltimore, MD (US)

(*) Notice: Subject to any disclaimer, the term of this patent is extended or adjusted under 35 U.S.C. 154(b) by 37 days.

(21) Appl. No.: 16/015,560

(22) Filed: Jun. 22, 2018

(65) Prior Publication Data

US 2019/0394541 A1 Dec. 26, 2019

(51) Int. Cl.
*H04Q 9/00* (2006.01)
*G01K 1/02* (2006.01)

(52) U.S. Cl.
CPC .............. *H04Q 9/00* (2013.01); *G01K 1/024* (2013.01); *H04Q 2209/40* (2013.01); *H04Q 2209/84* (2013.01)

(58) Field of Classification Search
CPC .. H04Q 9/00; H04Q 2209/40; H04Q 2209/84; G01K 1/024
See application file for complete search history.

(56) References Cited

U.S. PATENT DOCUMENTS

| 4,876,899 | A | 10/1989 | Strott et al. | |
|---|---|---|---|---|
| 6,225,817 | B1* | 5/2001 | Sayre | G01R 1/07328 |
| | | | | 324/750.25 |
| 6,857,484 | B1* | 2/2005 | Helms | E21B 41/0085 |
| | | | | 175/57 |
| 2009/0301723 | A1* | 12/2009 | Gray | E21B 23/00 |
| | | | | 166/301 |
| 2011/0017473 | A1* | 1/2011 | Clarkson | E21B 7/062 |
| | | | | 166/380 |

(Continued)

FOREIGN PATENT DOCUMENTS

GB 2187848 A 9/1987

OTHER PUBLICATIONS

Search Report from the British Patent Office dated Nov. 26, 2019 in related British application No. 1907141.1.

*Primary Examiner* — Amine Benlagsir
(74) *Attorney, Agent, or Firm* — J-Tek Law PLLC; Scott T. Wakeman; Mark A. Ussai

(57) ABSTRACT

A telemetry unit for high speed shafts includes a metallic annular carrier having an inner circumferential surface defining a bore, for receiving a shaft or sleeve to rotatably couple the telemetry unit with the shaft, an outer circumferential surface, opposing axial ends, and interior cavities. An annular insulator formed of an electrically insulative material has an inner circumferential surface disposed about the carrier outer surface, an outer circumferential surface, and opposing axial ends. A generally circular antenna is disposed circumferentially about the insulator outer surface and an annular retainer is disposed about the insulator outer surface such that the antenna is generally sandwiched between the retainer and the insulator to generally fix the antenna relative to the carrier. The carrier engages a portion of the insulator outer surface to prevent radially-outward displacement of the insulator when the telemetry unit rotates about the axis.

20 Claims, 10 Drawing Sheets

(56) References Cited

U.S. PATENT DOCUMENTS

| | | | |
|---|---|---|---|
| 2011/0234230 A1* | 9/2011 | Bittar | E21B 47/01 |
| | | | 324/333 |
| 2012/0255772 A1* | 10/2012 | D'Angelo, III | H02G 15/18 |
| | | | 174/75 R |
| 2019/0316432 A1* | 10/2019 | Michaud | E21B 23/00 |

* cited by examiner

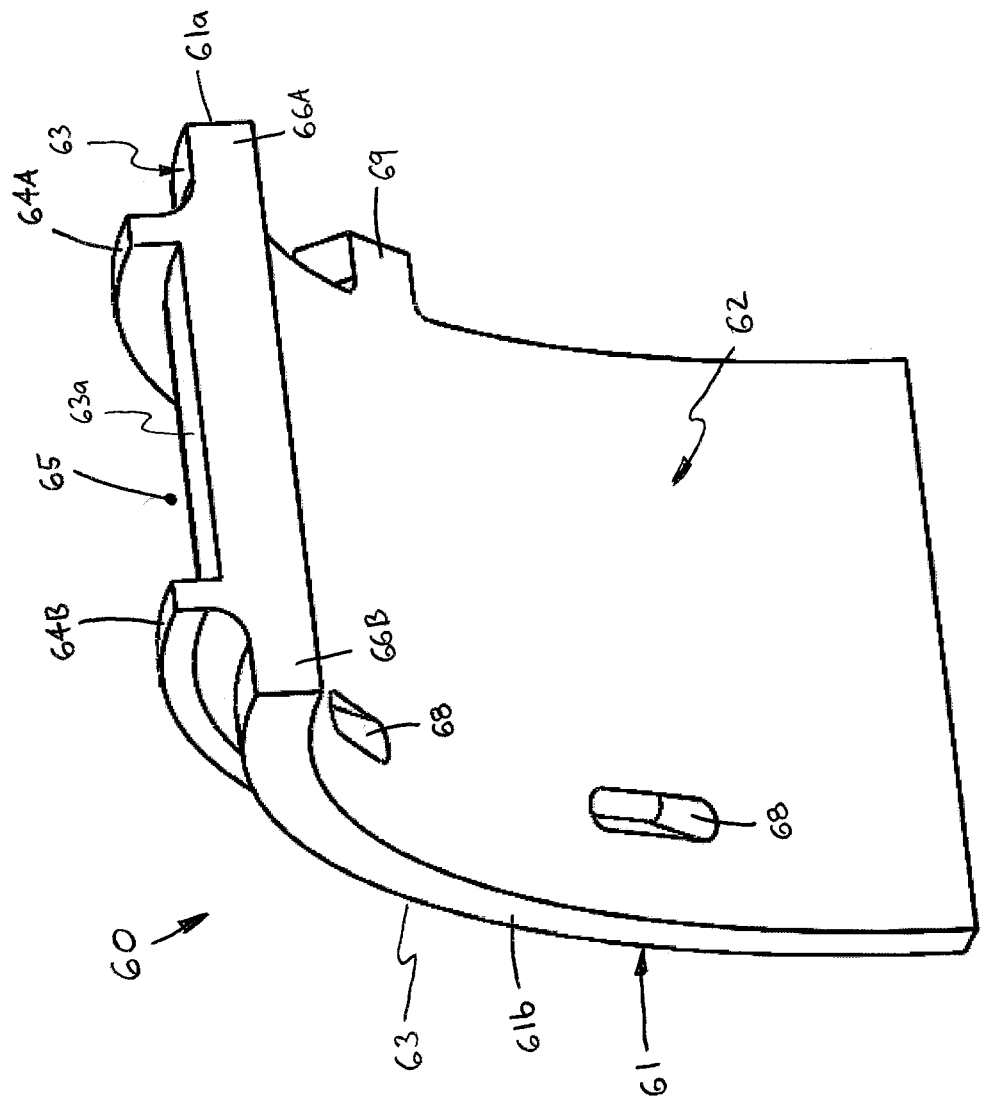

TELEMETRY UNIT FOR HIGH SPEED SHAFT ASSEMBLIES

BACKGROUND OF THE INVENTION

The present invention relates to measuring devices, and more particularly to telemetry units for rotational shaft assemblies.

Telemetry units for rotational shaft assemblies are known and typically include one or more sensors for measuring a condition (e.g., temperature) of the shaft or a component mounted on the shaft. Such units generally transmit data wirelessly and as such, further include at least one transmitter connected with each sensor and an antenna for wirelessly transmitting data from the transmitter. These components are typically contained within a housing or carrier mountable on the shaft, which functions to both properly position and to protect the various electrical components.

SUMMARY OF THE INVENTION

In one aspect, the present invention is a telemetry unit for taking data measurements on a shaft assembly including a shaft rotatable about a central axis and at least one component mounted about the shaft. The telemetry unit comprises a generally annular carrier formed of a metallic material and having an inner circumferential surface defining a bore, the bore being configured to receive a portion of the shaft or a sleeve disposed about the shaft so as to rotatably couple the telemetry unit with the shaft, an outer circumferential surface, opposing first and second axial ends, and at least one interior cavity. A generally annular insulator is formed of an electrically insulative material and has an inner circumferential surface disposed about the carrier outer surface, an outer circumferential surface, and opposing first and second axial ends. A generally circular antenna is disposed circumferentially about the insulator outer surface and a generally annular retainer is disposed about at least a portion of the insulator outer surface such that the antenna is generally sandwiched between the retainer and the insulator to generally fix the antenna relative to the carrier. Further, the carrier is configured to engage a portion of the insulator outer surface to prevent radially-outward displacement of the insulator when the telemetry unit rotates about the axis.

In another aspect, the present invention is a mechanical assembly comprising a shaft rotatable about a central axis, a component mounted about the shaft and a telemetry unit as described in the preceding paragraph and further including and at least one sensor for measuring a condition of the shaft or component mounted on the shaft and at least one transmitter electrically coupled with the sensor and with the antenna to wirelessly transmit data measurements.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 10 is a broken-away, perspective view of the insulator;

DETAILED DESCRIPTION OF THE INVENTION

Figure 1:
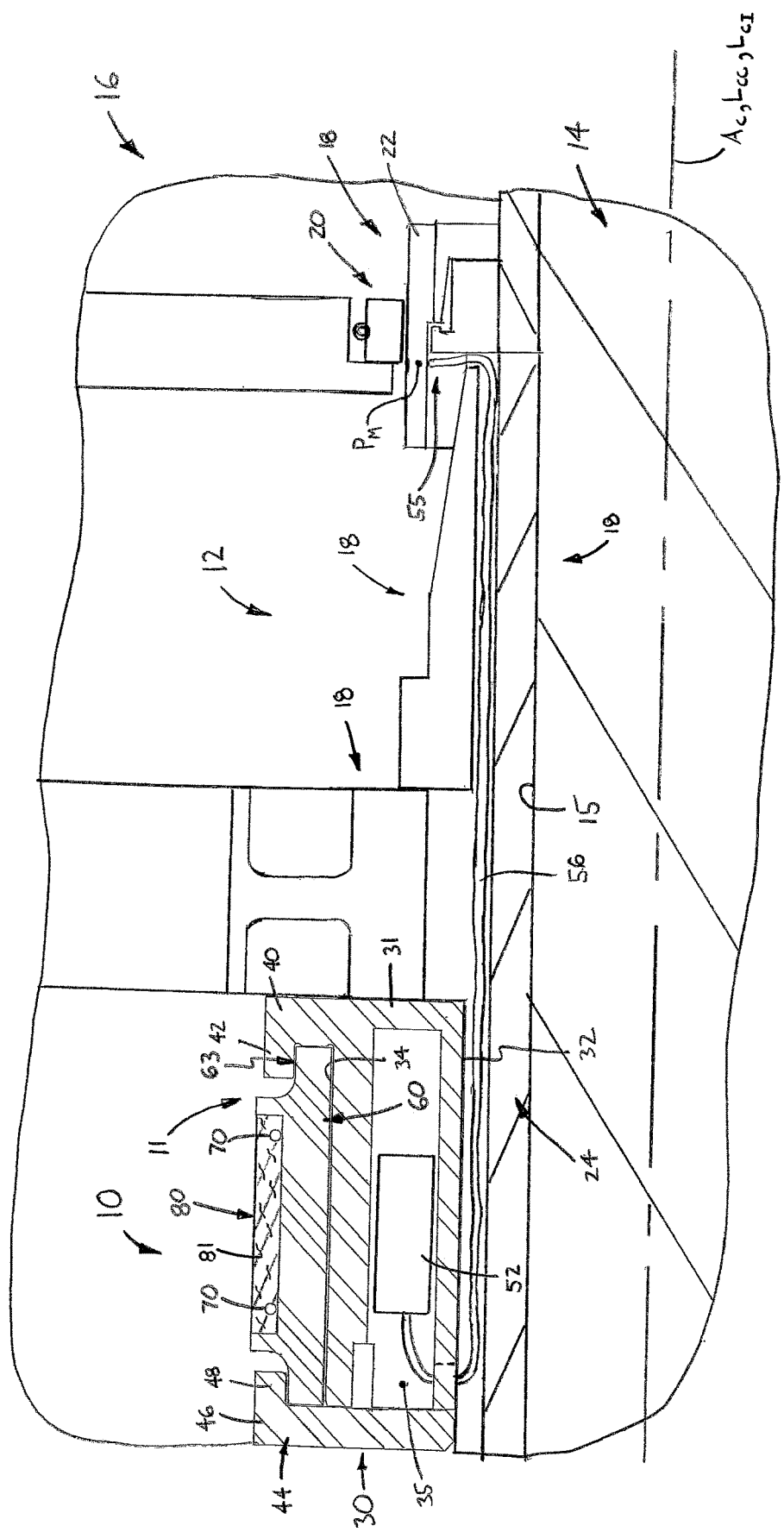
FIG. 1 is a broken-away, axial cross-sectional view of a shaft assembly including a telemetry unit in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-13 a telemetry unit 10 for data measurements on a shaft assembly 12 including a shaft 14 rotatable about a central axis $A_C$ and having an outer surface 15 and at least one component 18 mounted on the shaft 14. Such component(s) 18 may include, for example, an inner portion/runner 22 of a seal 20, a bearing inner ring (not shown), a sleeve 24, or any other shaft-mounted mechanical component (e.g., an impeller, etc.). The telemetry unit 10, the shaft 14, and the various components 18 mounted on the shaft 14 form at least a portion of a mechanical assembly 16, such as incorporated into an engine, a compressor, a pump, or any other known mechanical system incorporating a rotating shaft. The telemetry unit 10 is preferably constructed to function at a relatively high rotational speed, for example on a shaft 14 rotatable at a speed within the range of about ten thousand rotations per minute (10,000 rpm) and about forty-three thousand rotations per minute (43,000 rpm), without damage to the various components of the unit 10, but may also be used in lower speed environments. Previously known telemetry units are generally not suitable for such high speed applications due to the inability of known insulating materials to withstand the excessive radial growth and hoop stress at high rotational speeds, as discussed in further detail below.

Figure 3:
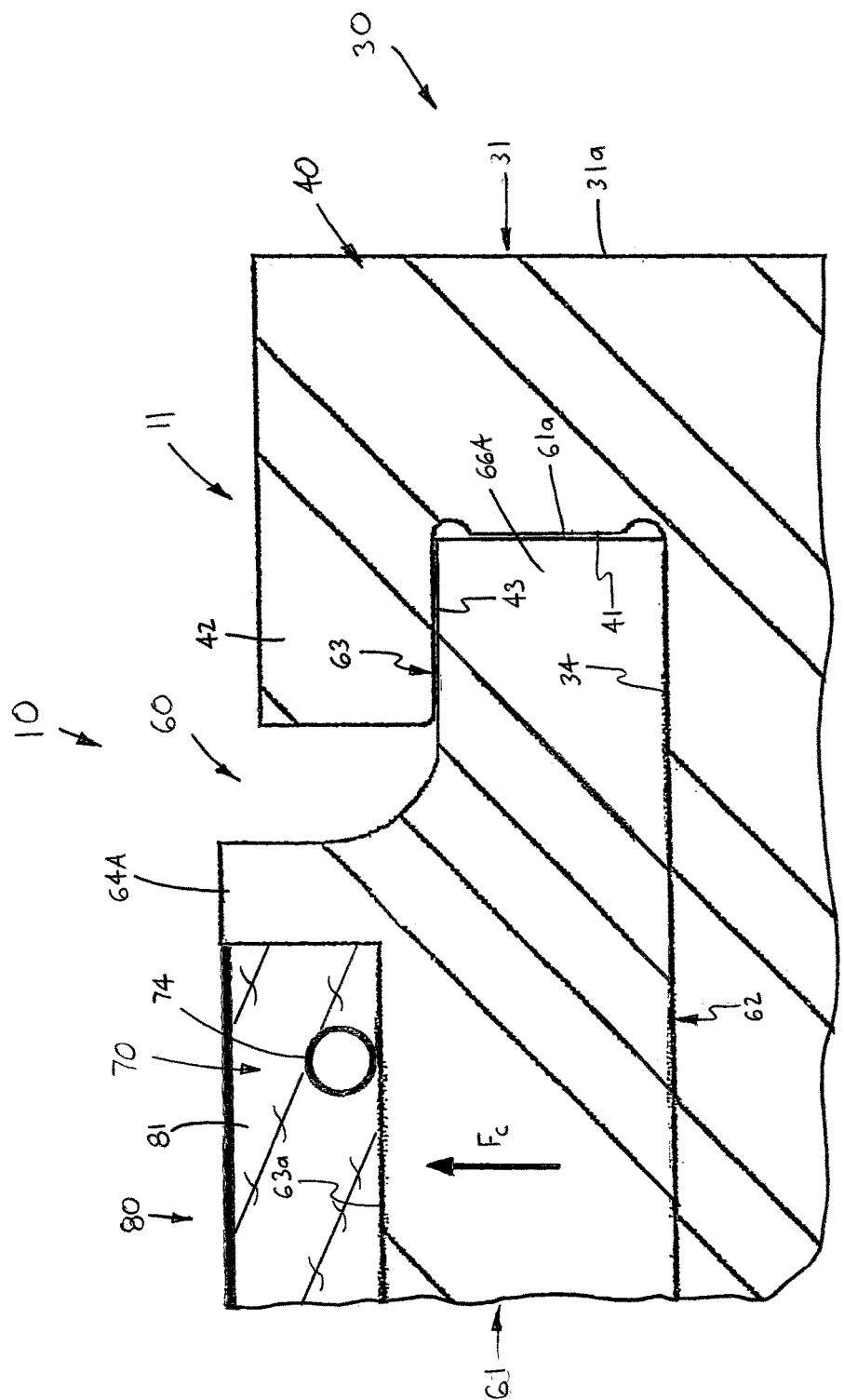
FIG. 3 is a greatly enlarged view of a portion of FIG. 2, depicting the functioning of a carrier counteracting centrifugal force on an insulator of the unit.
Figure 4:
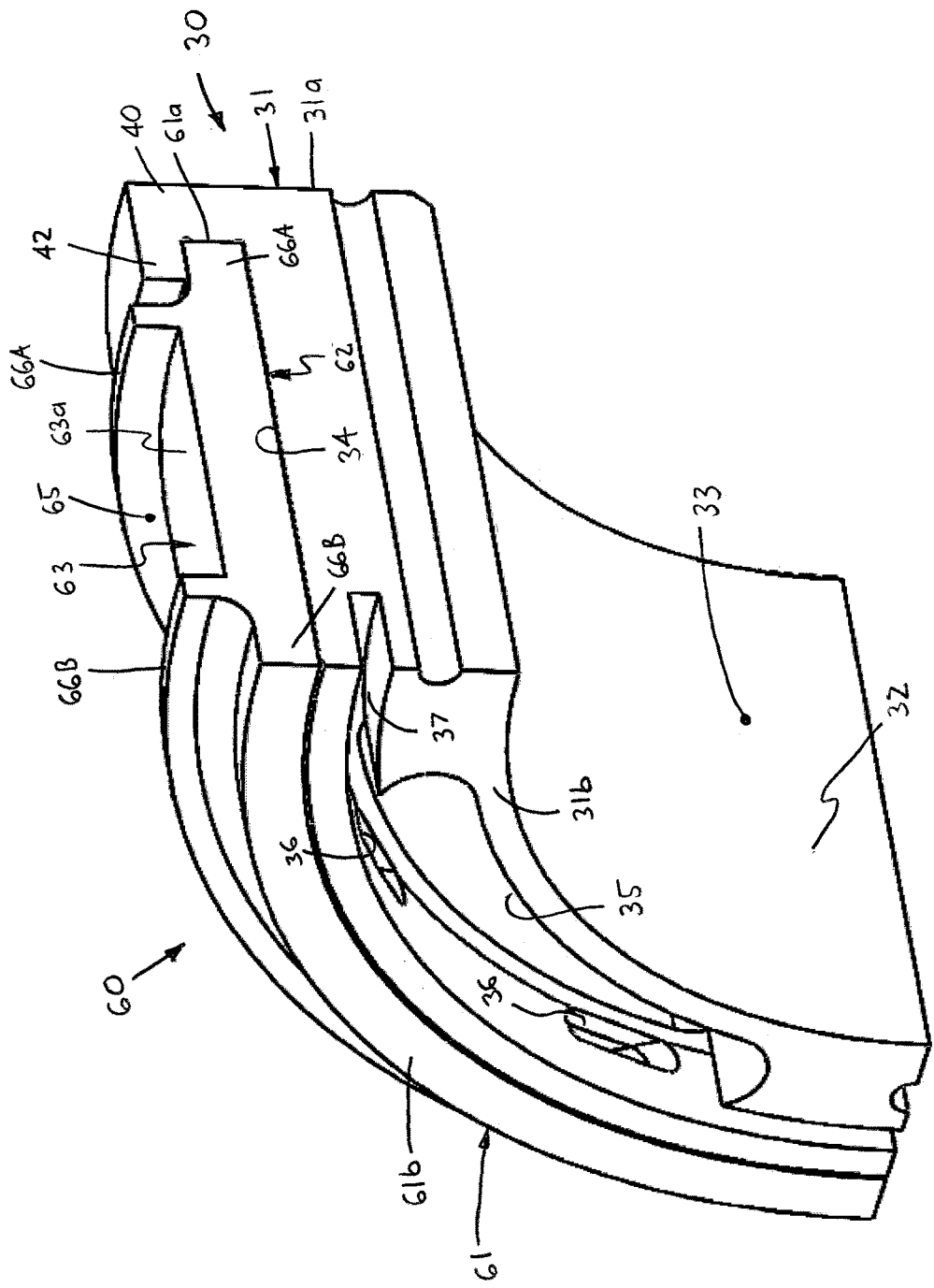
FIG. 4 is broken-away, perspective view of the carrier and insulator.

The telemetry unit 10 basically comprises an annular carrier 30 mounted on the shaft 14, at least one transmitter 50 disposed within the carrier 30, a sensor 55 electrically coupled with the transmitter 50, an annular electrical insulator 60 disposed about the carrier 30 and having an outer circumferential surface 63, at least one circular antenna 70 disposed about the insulator 60 and electrically coupled with the transmitter 50, and an annular retainer 80 disposed about the antenna 70 and at least a portion of the insulator 60. The carrier 30 is configured to engage with a portion of the insulator outer surface 63 to substantially prevent radially-outward displacement of the insulator 60, caused for example by centrifugal force $F_C$ as indicated in FIG. 3, so as to prevent damage of the insulator 60, as discussed in detail below. As described below, the carrier 30, the insulator 60 and the retainer 80 provide a housing assembly 11 for the various electrical components of the telemetry units 10, all of such electrical components preferably being conventional, commercially available items or devices (although may be specially manufactured or designed), and as such a detailed description of each is unnecessary and beyond the scope of the present disclosure.

Referring first to FIGS. 1-9, the carrier 30 includes a generally ring-like body 31 formed of a metallic material, preferably cast and machined aluminum or steel, but may be formed of any other metallic material by any appropriate process(es). The carrier body 31 has a centerline $L_{CC}$, an inner circumferential surface 32, an outer circumferential surface 34, and opposing first and second axial ends 30a, 30b. The carrier inner circumferential surface 32 defines a bore 33 configured to receive a portion of the shaft 14, or a sleeve 24 disposed about the shaft outer surface 15 (as depicted), so as to rotatably couple the telemetry unit 10 with the shaft 14. The carrier 30 includes at least one and preferably a plurality of interior cavities 35 for housing various electrical components, the one or more transmitters 50 being disposed within a separate one of the cavities 35, as discussed below.

Further, the carrier body 31 has at least one and preferably two generally radial passages 36 extending between each cavity 35 and the carrier outer surface 34. The radial passages 36 preferably extend partially axially and are slotted so as to extend partially circumferentially, and provide conduits for connector wires 56, as described below. Furthermore, the carrier body 31 preferably further includes an annular groove 37 extending generally axially-inwardly from the body second axial end 31b and circumferentially between the cavities 35. The annular groove 37 provides a clearance conduit for the connector wires 56 that electrically couple components within the adjacent cavities 35, as discussed below.

Still referring to FIGS. 1-9, the carrier 30 preferably includes at least one shoulder 40 extending generally radially outwardly from the carrier outer surface 34 and having at least one axially-extending lip portion or lip 42 with an inner circumferential surface 43 or surface sections 43, as discussed below. The shoulder lip inner surface 43 is disposeable against the insulator outer surface 63 so as to retain the insulator 60 radially between the carrier lip 42 and the carrier outer surface 34, as described in further detail below. Also, the carrier shoulder 40 preferably includes at least one and most preferably two retention recesses 49 (FIG. 5) extending axially-inwardly from an inner radial surface 41 of the shoulder 40, each recess 49 being configured to receive a separate one of two lugs 69 of the insulator 60, as described below.

Most preferably, the shoulder 40 is a first shoulder located at least generally adjacent to the carrier first axial end 31a and the carrier 30 further includes a generally annular cover member 44 coupleable with the carrier second axial end 31b and providing a second shoulder 46. Specifically, the cover member 44 has a generally disk-like body 45 with opposing inner and outer axial ends 45a, 45b, respectively, with the second shoulder 46 being provided by a radially-outer portion of the body 45. The cover member inner axial end 45a is disposeable against the carrier second axial end 31b and the cover member 45 is removably coupleable with the carrier 30, preferably by a plurality of threaded fasteners (not depicted). As such, the cover member 44 encloses, and alternatively provides access to, the one or more carrier cavities 35. Further, the cover shoulder 46 is generally radially-extending and has at least one generally axially-extending lip portion or lip 48 extending generally toward the first shoulder lip 42 (i.e., when the cover member 44 is attached with the carrier 30). The cover lip 48 has an inner circumferential surface 49 (or surface sections 49) disposeable against a portion of the insulator outer surface 63 adjacent to a second axial end 61b of the insulator 60 (as described below).

Preferably, the carrier shoulder 40 and the cover shoulder 46 each extend completely circumferentially about the centerline $L_{CC}$, i.e., as an integral ring or ring portion without interruption(s). Likewise, the shoulder axial lips 42, 48 each also extend circumferentially entirely about the centerline $L_{CC}$, such that the lips 42, 48 engage about the entire circular perimeter of the insulator 60, as discussed below. However, the shoulders 40, 46 and the lips 42, 48, or just the lips 42, 48, may be formed as a plurality of arcuate sections (not shown), such that portions of the insulator outer surface 63 adjacent to the insulator axial ends 60a, 60b are unengaged by the carrier 30.

Referring to FIGS. 1-4 and 11-13, the insulator 60 includes a relatively thin circular tubular body 61 having a centerline $L_{CI}$ and being formed of an electrically insulative material, most preferably molded of G10 material, a well-known composite material formed of fiberglass and resin. However, the insulator 60 may alternatively be formed of another fiberglass laminate, a carbon fiber laminate, Micarta or any other appropriate material and/or by any other appropriate process. In any case, the insulator 60 functions to electrically isolate the one or more antennas 70 from the metallic carrier 30 to prevent interference with data transmission from the antenna(s) 70 caused by the proximity of metallic material, as is well known in the art of wireless data transmission.

Further, the insulator body 61 has the outer circumferential surface 63 as discussed above, an opposing inner circumferential surface 62, and opposing first and second axial ends 61a, 61b. The insulator inner surface 62 is disposed circumferentially about and against the carrier outer surface 34 and the at least one antenna 70 is disposed circumferentially about the insulator outer surface 63, as discussed in further detail below. Further, the insulator 60 includes at least one and preferably at least two radial passages 68 each extending between the insulator inner and outer circumferential surfaces 62, 63, respectively. Each radial passage 68 is slotted so as to extend circumferentially, and preferably also extends partially axially, and is generally aligned with a separate one of the carrier radial passages 36 when the insulator 60 is disposed about the carrier 30. The radial passage(s) 68 each provide a conduit for the connector wires 56, as discussed below.

Furthermore, the insulator 60 is sized such that the insulator inner surface 62 has an inside diameter $ID_I$ (FIG. 11) slightly greater than an outside diameter $OD_C$ (FIG. 5) of the carrier outer surface 34. The insulator 60 is preferably mounted onto the carrier 30 by first inserting the carrier second axial end 31b into the insulator first axial end 61a, then sliding the insulator 60 axially until the insulator first axial end 61a is generally disposed against the carrier shoulder inner surface 41. The cover member 44 is thereafter attached to the carrier second axial end 31b, as discussed above, to retain the insulator 60 between the two carrier shoulders 40, 46.

Preferably, the insulator 60 further includes first and second annular ridges 64A, 64B extending radially outwardly from the outer circumferential surface 43 and circumferentially about the centerline $L_{CI}$. The two ridges 64A, 64B are spaced apart axially to define an annular recess 65 between the ridges 64A, 64B, with the antenna(s) 70 and the retainer 80 each being disposed within the recess 65. The ridges 64A, 64B function to ensure electrical "isolation" of the antenna(s) 70 from proximal portions of the metallic carrier 30. Further, the two ridges 64A, 64B also define an insulator first annular flange portion 66A between the first ridge 64A and the body first axial end 61a and an insulator second annular flange portion 66B between the second ridge 64B and the body second axial end 61b. Furthermore, the insulator body 61 also preferably includes at least one and preferably two retention lugs 69 (FIG. 10; only one shown) each extending generally axially from the first axial end 61a and disposed within a separate one of the carrier retention recesses 49. The engagement of the retainer lugs 69 with the carrier recesses 49 prevents angular displacement of the insulator 60 relative to the carrier 30.

Figure 2:
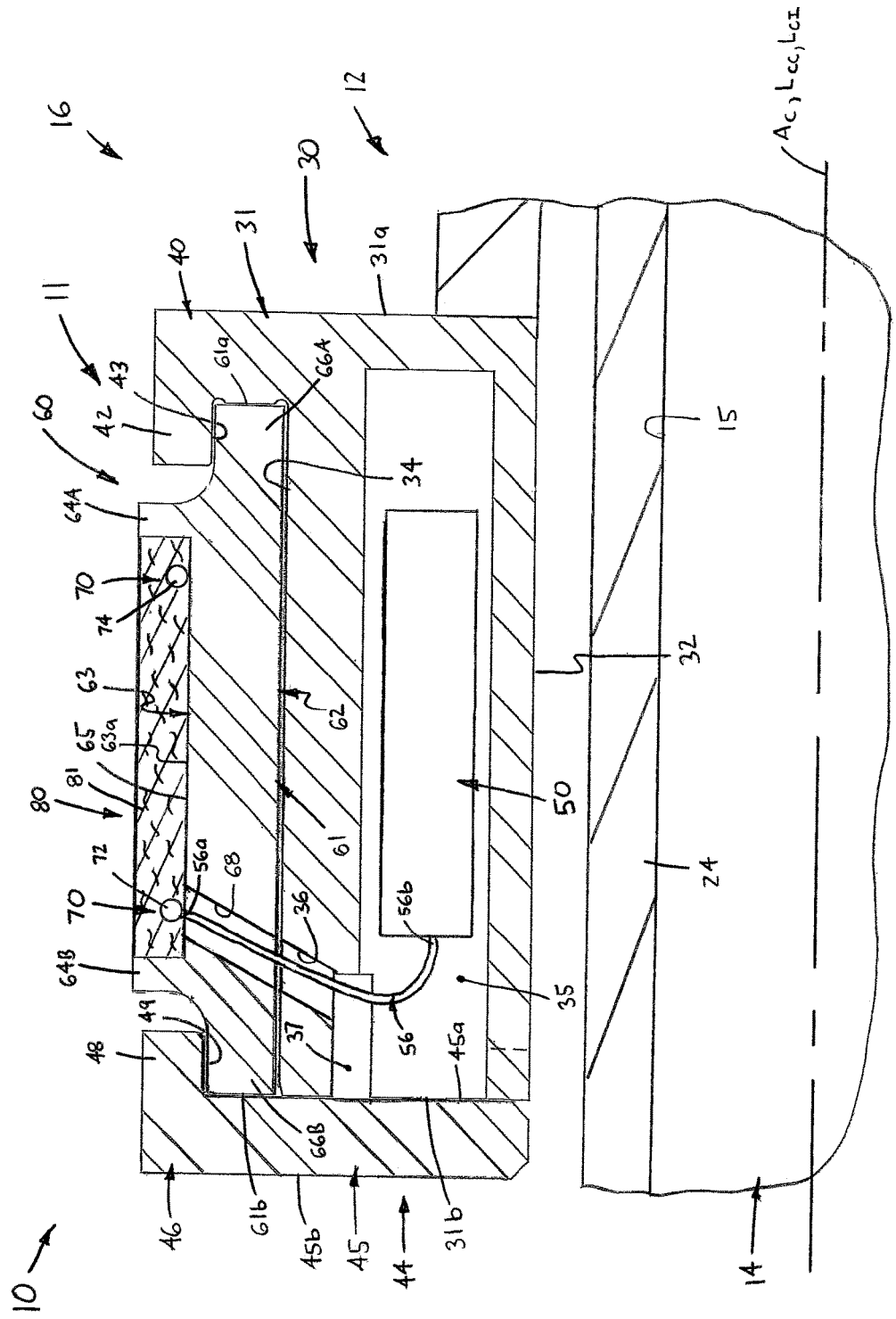
FIG. 2 is an enlarged axial cross-sectional view of the telemetry unit.

With the above-described structures, the carrier 30 preferably engages with the insulator 60 to prevent radially-outward displacement of the insulator 60 in the following manner. The carrier first axial lip 42 is engageable with the insulator first flange portion 66A and the carrier second axial lip 48, preferably provided on the cover member 44, is engageable with the insulator second flange portion 66B. More specifically, each lip inner circumferential surface(s) 43, 49 is disposed about and against the insulator outer surface 63, such that the insulator 60 is closely sandwiched between the lip inner surfaces 43, 49 and the carrier outer surface 34, as best shown in FIGS. 2 and 3. Such engagement of the carrier lips 42, 48 with portions of the insulator outer surface 63 adjacent to the axial ends 61a, 61b substantially prevents radially-outward displacement of the insulator 60. Particularly with a shaft 14 rotating at relatively high speed, such as 10,000 rpm-43,000 rpm (or greater) as discussed above, centrifugal forces $F_C$ on the insulator 60 would otherwise lead to radially-outward "growth" or strain displacement, generating substantial circumferential hoop stresses. Due to the nature of the laminated structure of the preferred G10 material, such stresses and strains may fracture the material and lead to failure or breakage of the insulator 60.

Referring to FIGS. 1-3, the retainer 80 includes a generally thin-walled circular tubular body 81, which is preferably formed of a plurality of "wrappable" protective fibers or strands. Most preferably, the retainer 80 is formed of wound Kevlar, but may be formed of another aramid fiber or any other appropriate protective material of any appropriate structure (e.g., layers, arcuate tubular portions, etc.). The retainer 80 is disposed about at least a portion of the insulator outer surface 63, preferably the insulator surface section 63a within the recess 65. As such, each antenna 70 is generally sandwiched between the retainer 80 and the insulator 60, and is most preferably embedded at least partially within the wound body of the retainer 80. Thereby, each antenna 70 is generally fixed relative to the carrier 30 so as to prevent any radial (or even axial) displacement during rotation of the shaft 14 and the carrier 30. The retainer 80 also functions to enclose or cover the antenna(s) 70 to prevent damage thereto, such as from debris of foreign matter entering the shaft assembly 12.

Figure 5:
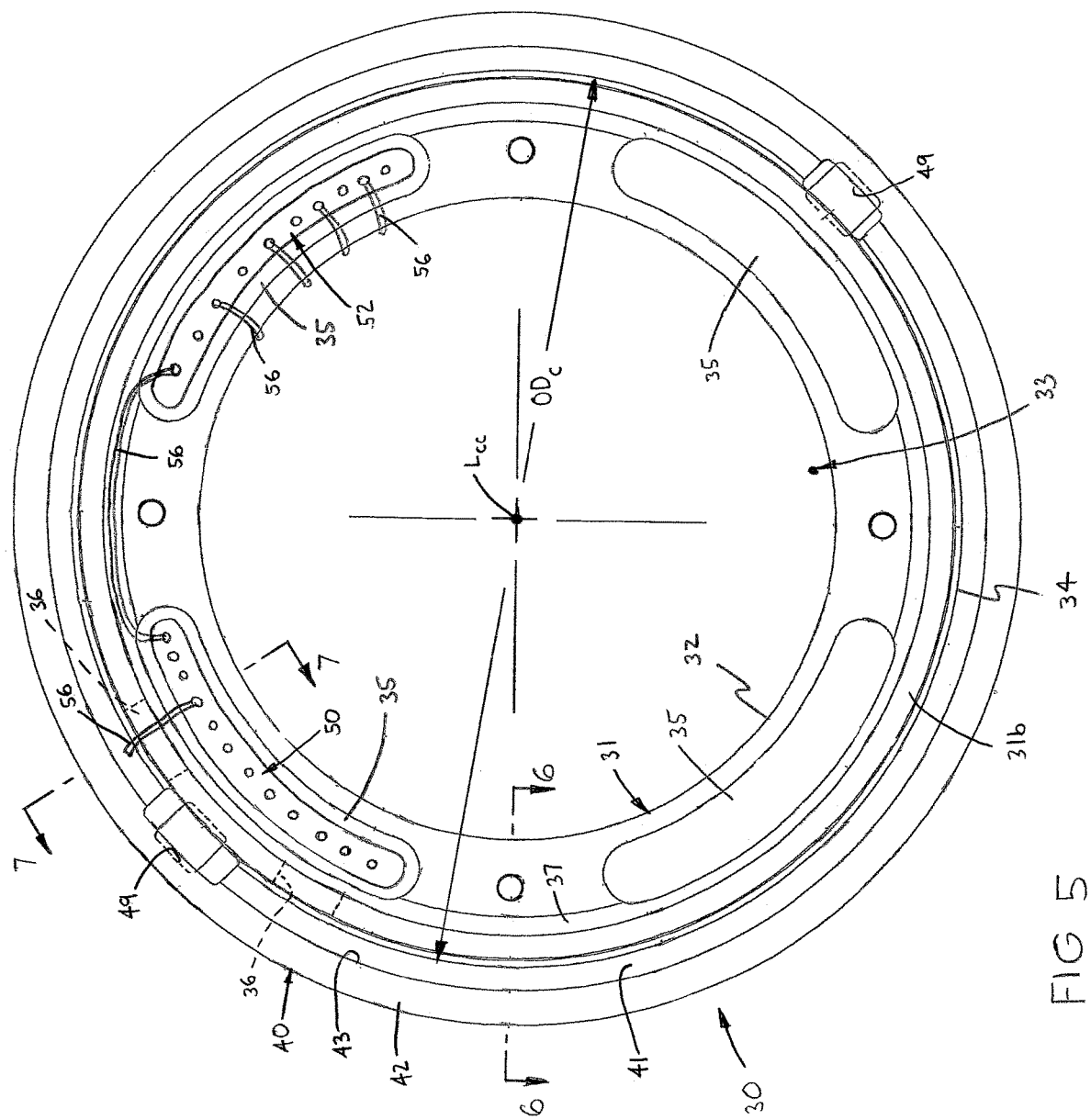
FIG. 5 is a side plan view of the carrier, shown with a transmitter and a signal conditioner.
Figure 6:
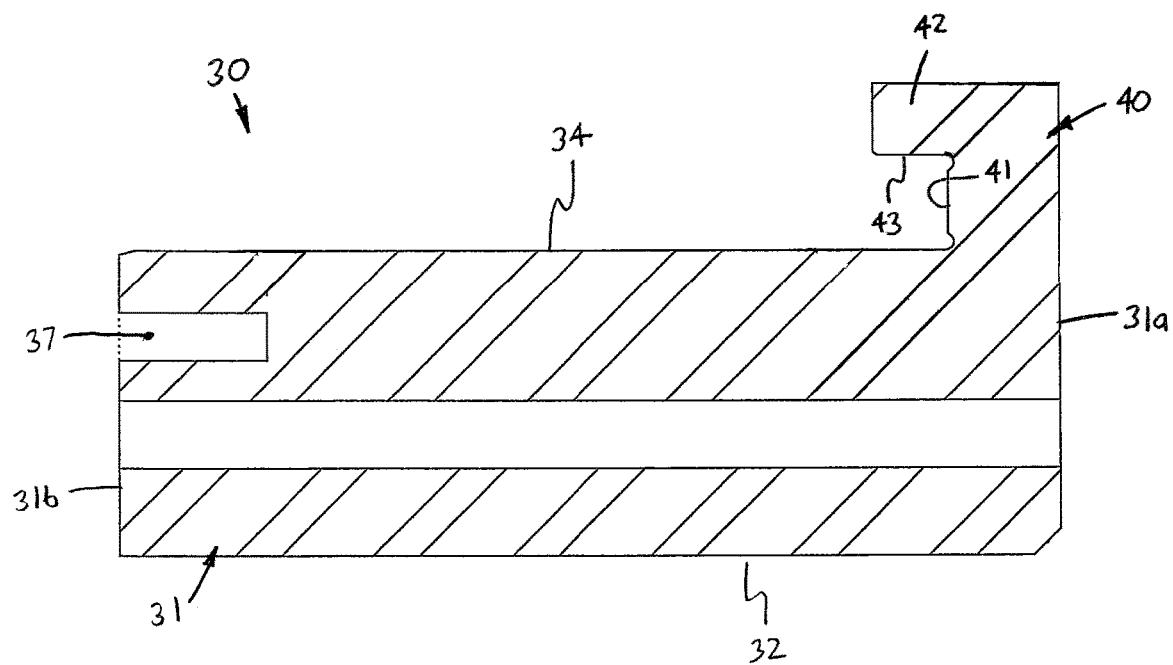
FIG. 6 is a view through line 6-6 of FIG. 5.
Figure 7:
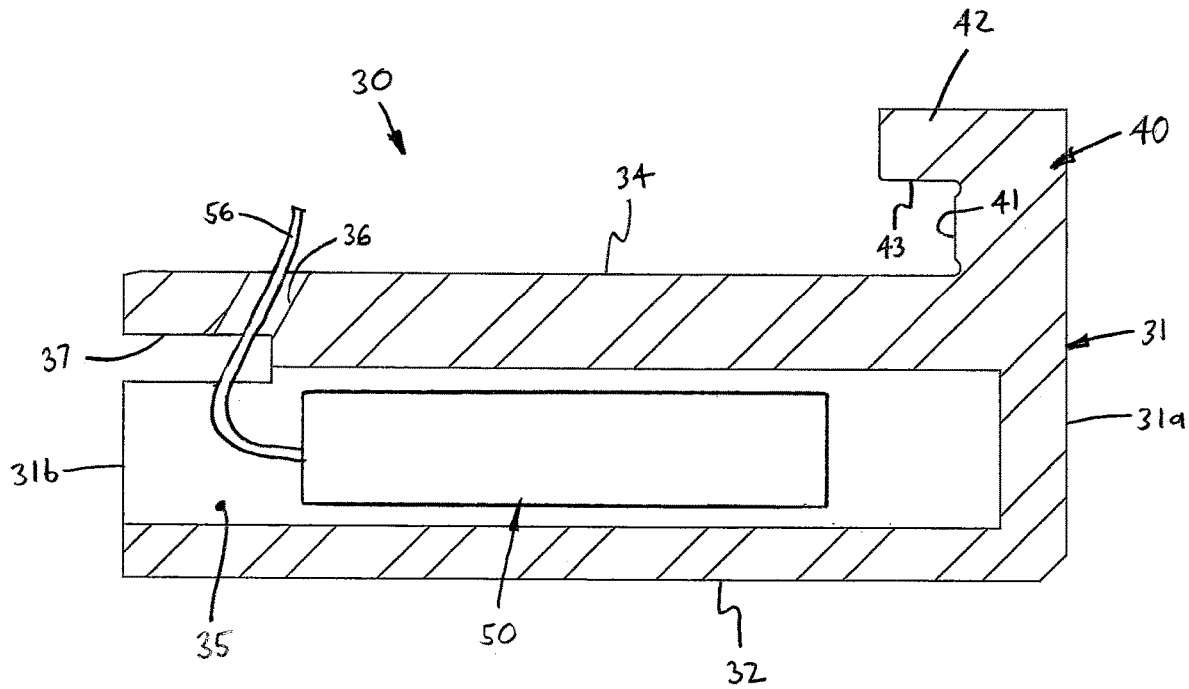
FIG. 7 is a view through line 7-7 of FIG. 5.
Figure 9:
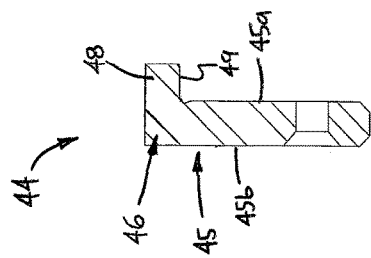
FIG. 9 is an axial cross-sectional view of the carrier cover.
Figure 8:
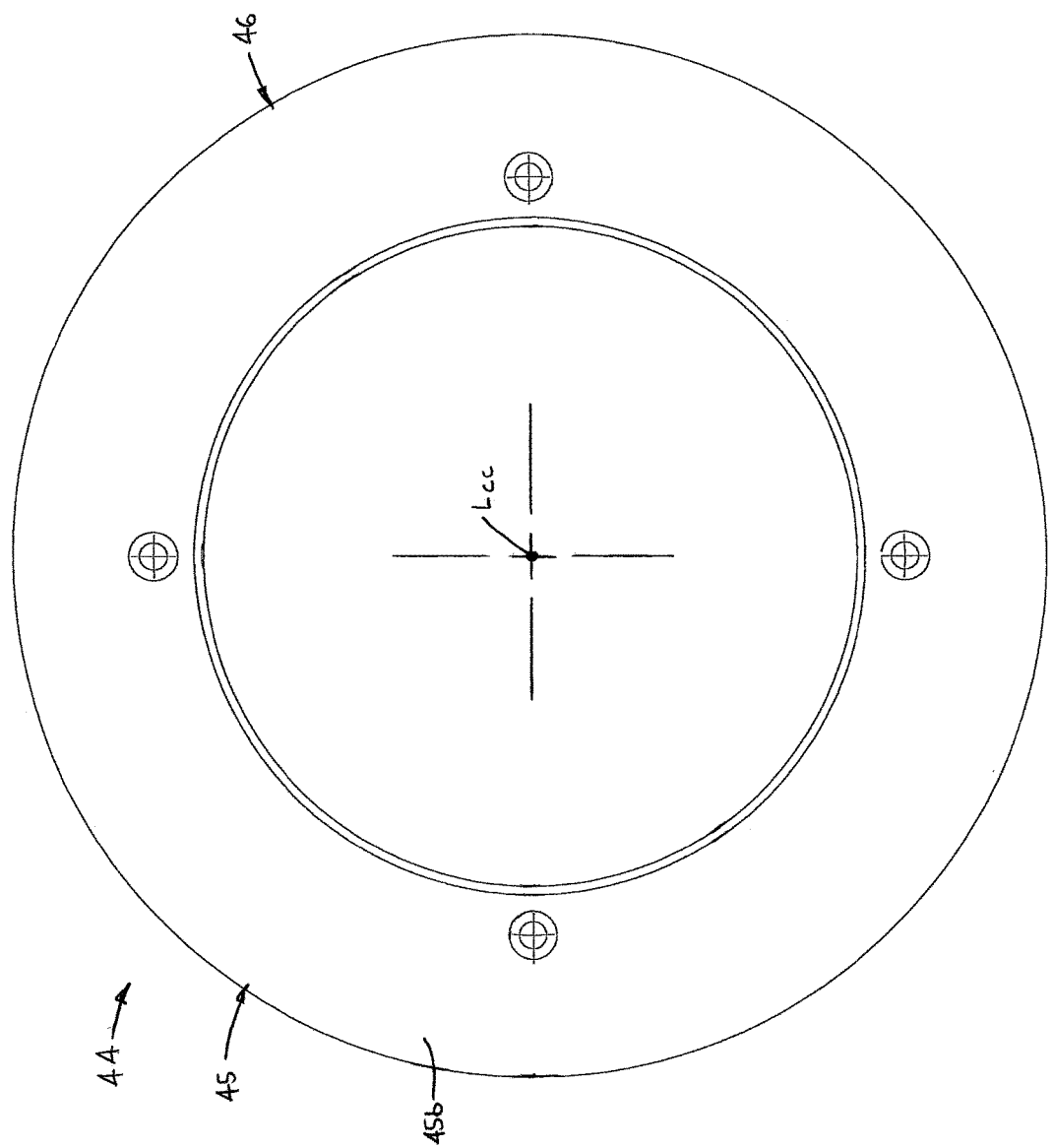
FIG. 8 is a side plan view of a cover of the preferred carrier.
Figure 11:
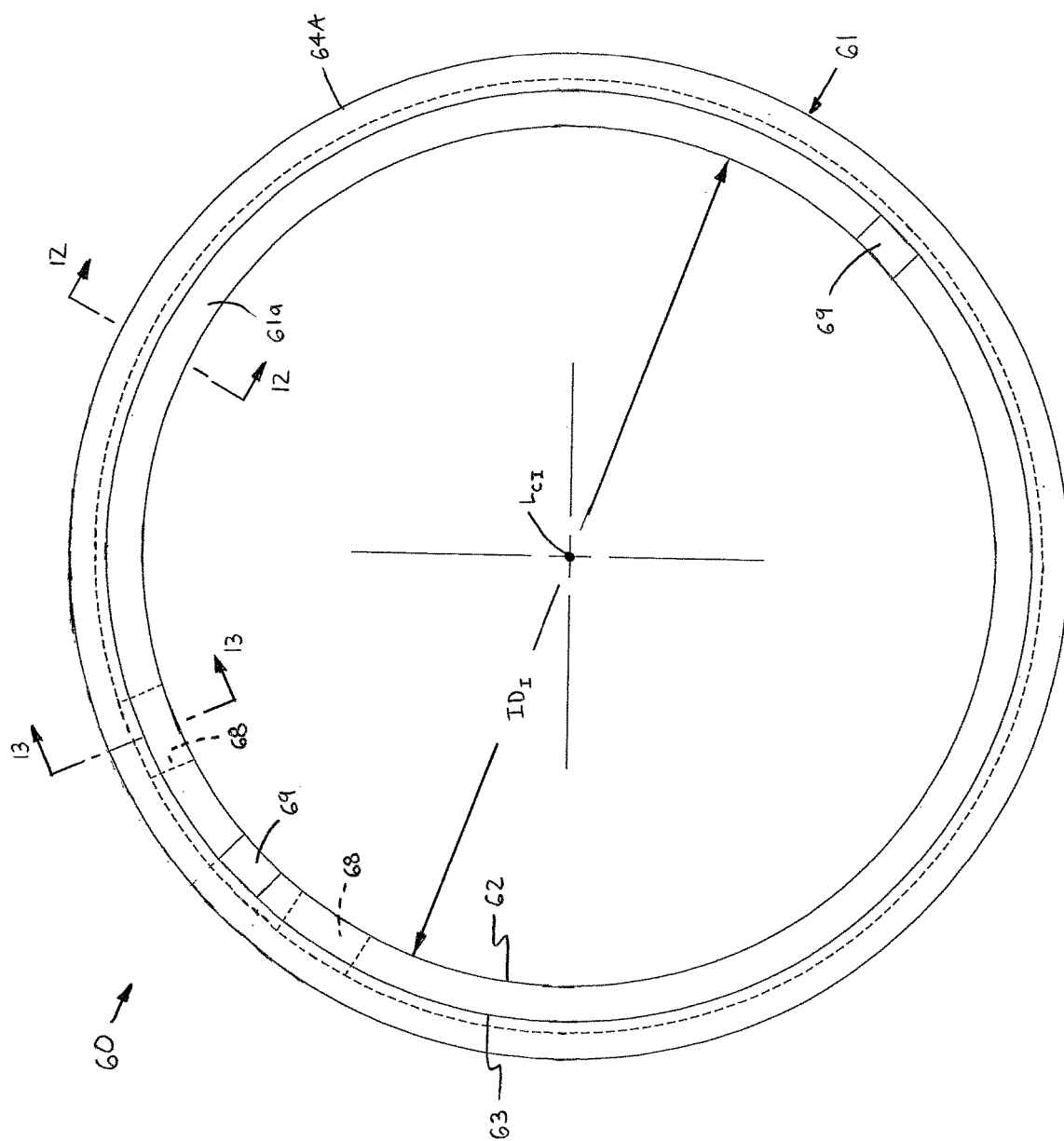
FIG. 11 is a side plan view of the insulator.
Figure 12:
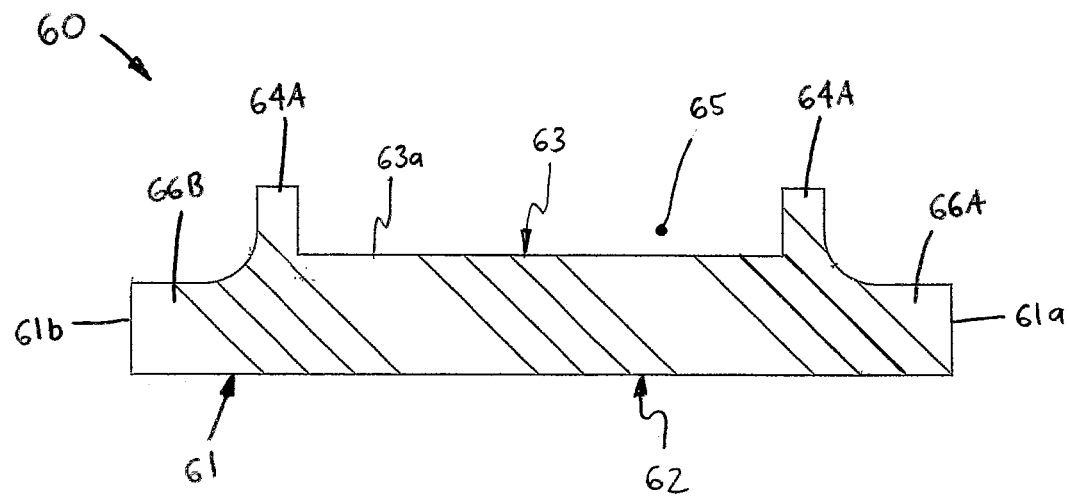
FIG. 12 is a view through line 12-12 of FIG. 11.
Figure 13:
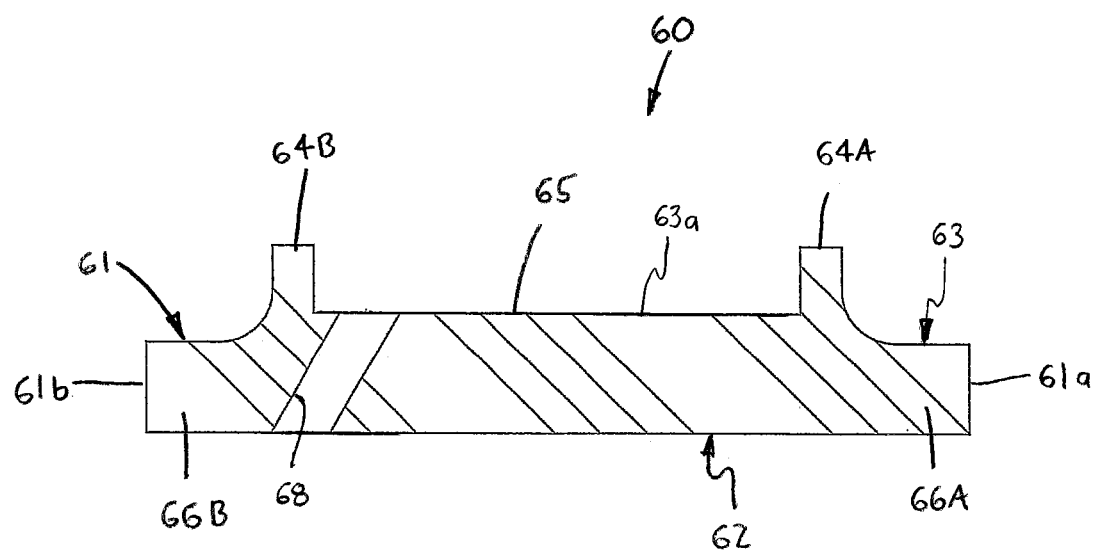
FIG. 13 is a view through line 13-13 of FIG. 11.

Referring now to the FIGS. 1, 2 and 5, having described the housing assembly 11 in detail above, the various electrical components of the telemetry unit 10 are now discussed in further detail. The at least one sensor 55 is configured to sense a condition at a measurement point $P_M$ on the shaft 14 or on a component mounted about the shaft 14, such as the seal inner portion/runner 22, the bearing inner ring (not shown), the sleeve 24 or any other component mounted about the rotating shaft 14. Preferably, the sensor 55 is a temperature sensor, most preferably a thermocouple, configured to sense the temperature of a seal runner 22, as depicted in FIG. 1. However, the sensor 55 may be alternatively configured to sense strain or torque on the runner 22 or/and on other rotating component(s) 18, or any other desired property or physical quantity of the components 18 or of the shaft 14. Further, the telemetry unit 10 preferably includes a plurality of the sensors 55 each acquiring data at a separate one of a plurality of different measurement points $P_M$ (only one shown). Further, the sensors 55 may either be all of the same type (e.g., temperature sensors) or may be of two or more different types (e.g., temperature sensors and strain sensors, etc.).

In many applications and as depicted, the telemetry unit 10 is preferably spaced a sufficient axial distance from the component 18 being sensed (e.g., the seal runner 22) to avoid potential adverse conditions, such as relatively high temperatures, at the point $P_M$ where condition measuring or monitoring is occurring. As such, each sensor 55 either includes or is provided with one or more connecting wires 56 extending between the measurement point $P_M$ and the associated transmitter 50 or a signal conditioner 52, as discussed below.

Referring to FIGS. 1, 2 and 5, the one or more transmitters 50 are each disposed within a separate one of the carrier cavities 35. Each transmitter 50 is electrically coupled with one or more sensors 55 and with the transmitting antenna 72 (as discussed below) and is configured to transmit data received from the sensor(s) 55 through the antenna 70. Preferably, the telemetry unit 10 further comprises at least one signal conditioner 52 disposed within at least a second one of the cavities 35, i.e., the transmitter 50 is disposed within a first cavity 35 and the at least one signal conditioner 52 is disposed within a different or second cavity 35. Each transmitter 50 and each conditioner 52 is preferably secured within the associated cavity 35 by a suitable potting compound, such as an epoxy. Each signal conditioner 52 is directly electrically coupled with one or more of the sensors 55 and with a separate one of the transmitters 50. Further, the signal conditioners 52 are each configured to convert analog signals received from each sensor 55 into digital signals that are transmitted to the associated transmitter 50. However, if the sensor(s) 55 are each configured to take digital measurements, or if the transmitter(s) 50 have analog-to-digital circuitry, the telemetry unit 10 may be constructed without any separate signal conditioner(s).

Further, one antenna 70 is preferably a first, "transmitting" antenna 72 and is configured to transmit data from the transmitter 50 to a stationary antenna (not shown) disposed circumferentially about the telemetry unit 10 and attached to a non-rotational structure, such as a housing, surrounding the shaft assembly 12. Preferably, the telemetry unit 10 further comprises a second, "power" antenna 74 disposed circumferentially about the insulator 60, spaced axially from the first antenna 72 and similarly sandwiched between the retainer 80 and the insulator 60. The second antenna 74 is configured to receive electrical power from a stationary power source (not shown) and to transmit the power to the one or more transmitters 50.

Furthermore, to electrically connect the transmitting antenna 72 and the power antenna 74 with the one or more transmitter(s) 50, the telemetry unit 10 further comprises at least one and preferably at least two connector wires 56 for coupling the antennas 72, 74 with the at least one transmitter 50. One connector wire 56 (as depicted) is disposed at least partially within one insulator passage 68 and within the aligned carrier passage 36 and has a first end 56a connected with the transmitting antenna 72 and a second end 56b connected with one of the transmitters 50. The other connector wire (not depicted) is disposed at least partially within the other insulator passage 68 and within the aligned carrier passage 36 and has a first end connected with the power antenna 74 and a second end connected with the power module (not indicated) of the one transmitter 50.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A telemetry unit for data measurements on a shaft assembly including a shaft rotatable about a central axis, the telemetry unit comprising:
    a generally annular carrier formed of a metallic material and having an inner circumferential surface defining a bore, the bore being configured to receive a portion of the shaft or a sleeve disposed about the shaft so as to rotatably couple the telemetry unit with the shaft, an outer circumferential surface, opposing first and second axial ends, and at least one interior cavity;
    a generally annular insulator formed of an electrically insulative material and having an inner circumferential surface disposed about the carrier outer surface, an outer circumferential surface, and opposing first and second axial ends;
    a generally circular antenna disposed circumferentially about the insulator outer surface; and
    a generally annular retainer disposed about at least a portion of the insulator outer circumferential surface such that the antenna is generally sandwiched between the retainer and the insulator to generally fix the antenna relative to the carrier;
    wherein the carrier is has an integral portion configured to engage the at least the portion of the insulator outer circumferential surface to prevent radially-outward displacement of the insulator when the telemetry unit rotates about the axis.

2. The telemetry unit as recited in claim 1 further comprising:
    at least one sensor configured to sense a condition of the shaft or of a component mounted about the shaft; and
    a transmitter disposed within the at least one carrier cavity, electrically coupled with the at least one sensor and with the antenna and configured to transmit data received from the at least one sensor through the antenna.

3. The telemetry unit as recited in claim 2 wherein:
    the at least one carrier cavity includes at least first and second cavities, the transmitter being disposed within the at least first cavity; and
    the telemetry unit further comprises at least one signal conditioner converter disposed within the at least second cavity, the at least one signal conditioner converter being electrically coupled with the at least one sensor and with the transmitter and configured to convert analog signals received from the at least one sensor into digital signals transmitted to the transmitter.

4. The telemetry unit as recited in claim 2 wherein the antenna is a first antenna configured to transmit the data from the transmitter and the telemetry unit further comprises a second circular antenna disposed circumferentially about the insulator, spaced axially from the first antenna and sandwiched between the retainer and the insulator, the second antenna being configured to receive power from a power source and to transmit power to the transmitter.

5. The telemetry unit as recited in claim 2 wherein:
    the carrier has at least one generally first radial passage extending between the at least one interior cavity and the carrier outer surface;
    the insulator has at least one generally second radial passage extending between the insulator inner and outer circumferential surfaces and generally aligned with the at least one first radial passage of the carrier; and
    the telemetry unit further comprises a connector wire disposed at least partially within the at least one insulator second radial passage and within the at least one carrier first radial passage, the connector wire having a first end connected with the antenna and a second end connected with the transmitter.

6. The telemetry unit as recited in claim 2 wherein the at least one sensor is configured to sense one of temperature, strain and torque.

7. The telemetry unit as recited in claim 1 wherein a first portion of the carrier and the insulator includes at least one retention recess and a second portion of the carrier and the insulator includes at least one retention lug disposed within the at least one retention recess to prevent angular displacement of the insulator relative to the carrier.

8. The telemetry unit as recited in claim 1 wherein:
    the carrier is formed of one of aluminum and steel;
    the insulator is formed of one of G10 material, another fiberglass laminate, a carbon fiber laminate and Micarta; and
    the retainer is formed of one of Kevlar and another aramid fiber.

9. The telemetry unit as recited in claim 1 wherein the carrier includes at least one shoulder extending radially outwardly from the carrier outer surface and having at least one axially-extending lip portion disposeable against the insulator outer surface so as to retain the insulator radially between the at least one lip portion of the at least one carrier shoulder and the carrier outer surface.

10. The telemetry unit as recited in claim 9 wherein:
    the at least one shoulder is located at least generally adjacent to the carrier first axial end and is disposeable against a portion of the insulator outer surface adjacent to the insulator first axial end; and
    the carrier further includes a generally annular cover member coupleable with the second axial end of the carrier so as to enclose the at least one cavity and having a generally radially-extending shoulder with at least one generally axially-extending lip disposeable against the portion of the insulator outer surface adjacent to the insulator second axial end.

11. The telemetry unit as recited in claim 10 wherein the cover member is removably coupled with the carrier such that the insulator is installable about the carrier by sliding the insulator over the carrier second axial end until the insulator first axial end is disposed against the at least one shoulder.

12. The telemetry unit as recited in claim 1 wherein the insulator has a centerline and includes first and second annular ridges extending radially outwardly from the outer circumferential surface of the insulator and circumferentially about the centerline, the two ridges being spaced apart axially to define an annular recess, the antenna and the retainer each being disposed within the recess.

13. The telemetry unit as recited in claim 12 wherein:
the insulator has a first annular flange portion defined between the first ridge and the first axial end of the insulator and a second annular flange portion defined between the second ridge and the second axial end of the insulator; and
the carrier has a first axial lip engageable with the insulator first flange portion and a second axial lip engageable with the insulator second flange portion so as to retain the insulator within the recess.

14. A mechanical assembly comprising:
a shaft rotatable about a central axis;
a component mounted about the shaft; and a telemetry unit including:
a generally annular carrier formed of a metallic material and having an inner circumferential surface defining a bore, the bore being configured to receive a portion of the shaft or a sleeve disposed about the shaft so as to rotatably couple the telemetry unit with the shaft, an outer circumferential surface, opposing first and second axial ends, and at least one interior cavity;
at least one sensor configured to sense a condition of the shaft or of the component;
a transmitter disposed within the at least one carrier cavity and electrically coupled with the at least one sensor;
a generally annular insulator formed of an electrically insulative material and having an inner circumferential surface disposed about the carrier outer surface, an outer circumferential surface, and opposing first and second axial ends;
a generally circular antenna disposed circumferentially about the insulator outer surface and electrically coupled with the transmitter such that the transmitter transmits data received from the least one sensor through the antenna; and
a generally annular retainer disposed about at least a portion of the insulator outer surface such that the antenna is generally sandwiched between the retainer and the insulator to generally fix the antenna relative to the carrier;
wherein the carrier is has an integral portion configured to engage the at least the portion of the insulator outer circumferential surface to prevent radially-outward displacement of the insulator when the telemetry unit rotates about the axis.

15. The mechanical assembly as recited in claim 14 wherein the shaft is rotatable at a speed within a range of ten thousand rotations per minute (10,000 rpm) and forty-three thousand rotations per minute (43,000 rpm).

16. The mechanical assembly as recited in claim 14 wherein:
the at least one carrier cavity includes at least first and second cavities, the transmitter being disposed within the at least first cavity; and
the mechanical assembly further comprises at least one signal conditioner converter disposed within the at least second cavity, the at least one signal conditioner converter being electrically coupled with the at least one sensor and with the transmitter and configured to convert analog signals received from the at least one sensor into digital signals transmitted to the transmitter.

17. The mechanical assembly as recited in claim 14 wherein the antenna is a first antenna configured to transmit the data from the transmitter and the mechanical assembly further comprises a second circular antenna disposed circumferentially about the insulator, spaced axially from the first antenna and sandwiched between the retainer and the insulator, the second antenna being configured to receive power from a power source and to transmit power to the transmitter.

18. The mechanical assembly as recited in claim 14 wherein the carrier includes at least one shoulder extending radially outwardly from the carrier outer surface and having at least one axially-extending lip portion disposeable against the insulator outer surface so as to retain the insulator radially between the lip portion of the at least one carrier shoulder and the carrier outer surface.

19. The mechanical assembly as recited in claim 18 wherein:
the at least one shoulder is located at least generally adjacent to the carrier first axial end and is disposeable against the at least the portion of the insulator outer surface adjacent to the insulator first axial end; and
the carrier further includes a generally annular cover member coupleable with the second axial end of the carrier so as to enclose the at least one cavity and having a generally radially-extending shoulder with at least one generally axially-extending lip disposeable against the at least the portion of the insulator outer surface adjacent to the insulator second axial end.

20. The mechanical assembly as recited in claim 19 wherein the cover member is removably coupled with the carrier such that the insulator is installable about the carrier by sliding the insulator over the carrier second axial end until the insulator first axial end is disposed against the at least one shoulder.

* * * * *